United States Patent [19]

Leverett

[11] 4,356,792
[45] Nov. 2, 1982

[54] FLOORING SYSTEM

[76] Inventor: Peter J. Leverett, Kemballs Farm, Brettenham Rd., Buxhall, Stowmarket, Suffolk, England

[21] Appl. No.: 188,720

[22] Filed: Sep. 19, 1980

[30] Foreign Application Priority Data

Sep. 28, 1979 [GB] United Kingdom ............... 7933748

[51] Int. Cl.³ ................................................ A01K 1/00
[52] U.S. Cl. .................................................... 119/28
[58] Field of Search ...................... 119/28, 16; 52/668, 52/669, 664

[56] References Cited

U.S. PATENT DOCUMENTS

| | | | |
|---|---|---|---|
| 2,420,112 | 5/1947 | Utzler | 52/664 X |
| 2,645,985 | 7/1953 | Beebe et al. | 52/669 |
| 3,308,594 | 3/1967 | Ashworth | 52/669 X |
| 3,861,108 | 1/1975 | Hartman | 119/28 X |
| 3,927,950 | 12/1975 | Herrmann et al. | 52/668 X |
| 4,048,960 | 9/1977 | Barnidge et al. | 119/28 |
| 4,258,662 | 3/1981 | Schafer | 119/28 |

Primary Examiner—Hugh R. Chamblee
Attorney, Agent, or Firm—McGlew and Tuttle

[57] ABSTRACT

A flooring system comprising a plurality of spaced load-bearing joists and flooring members which are carried thereby, extending at right-angles thereto. Each flooring member has a web and a pair of downwardly-depending flanges, and each joist is of generally triangular cross-section, with spaced pairs of slots for accommodating the flanges of the flooring members. Each slot of a pair thereof has a lesser length than the depth of the associated flange, but the flange also is provided with slots for accommodating parts of the associated joist, whereby the web of each flooring member may bear on the top faces of the joists it crosses. The flooring members and the joists may be made of a plastics material, such that the flooring members may be snap-fitted to the joists. The flooring members may be perforated and the pairs of slots in the joists spaced by such distances that there are gaps between parallel members, resulting in a ventilated floor which is particularly suitable for use in animal enclosures. The floor however also finds industrial applications, for instance where chemicals may be spilt and are to drain away.

11 Claims, 3 Drawing Figures

FLOORING SYSTEM

BACKGROUND OF THE INVENTION (a) Field of the Invention

This invention relates to a flooring system. The invention particularly (but not exclusively) concerns a ventilated flooring system, by which latter term is understood a flooring system having apertures therein, to allow the passage of gases, liquids, and also some solids therethrough, depending upon the aperture size. Such ventilated flooring systems are used for example in animal sheds and pens, because solid excreta can be forced therethrough by the animals themselves to a collection pit below the floor, leading to healthier conditions for the animals.

(b) Description of the Prior Art

There have been very many proposals for ventilated floors for livestock sheds and pens, to improve the conditions in which the animals have to live. In these proposals, it is the principal object to obtain the highest possible free air percentage—that is to say, the ratio (expressed as a percentage) of the total aperture area to the overall area of the floor—consistent with the other parameters which must be satisfied, such as strength. For instance, the floor must have sufficient strength to support the weight of the animals and must not be likely to damage the animals' feet. For example, there have been proposals for floors made from a network of round steel bars welded together at each crossing point, and though this exhibits a high free air percentage, nevertheless it can be hazardous to animals, especially those with cloven hooves, such as pigs. Also, floors of welded round bars are uncomfortable for the animals to sit or lie on, and the animals can easily slip on the bars when walking.

An added problem with ventilated floors through which animal excreta has to pass, particularly in the case of pigs, is that the excreta is most corrosive to common metals, such as iron, steel and alloys of metals such as an aluminum. Many of the previous proposals for ventilated floors for animal sheds or pens have displayed a very limited service life as a consequence. Plain steel floors, made for instance of perforated or expanded metal sheets suitably supported, have a very short service life and though this can be protracted considerably by galvanising, nevertheless the life is still not particularly long as compared for example to the life of the building in which the floor is installed. Considerable improvements can be made by coating the steel with a plastics material, for there are available plastics materials which are relatively resistant to attack by the corrosive agents in the animal excreta. However, it is found in practice that the plastics coating material can easily become chipped or scratched, leading to local corrosion of the steel substrate, followed by rapid peeling of the plastics coating material as corrosion spreads thereunder.

OBJECTS OF THE INVENTION

It is a principal object of this invention to provide a flooring system which can be ventilated if required, thereby rendering the floor suitable for use in animal enclosures such as livestock sheds, pens, farrowing crates and the like, because excreta may pass therethrough to a collection pit below. A further object is to provide a floor which can be made largely or wholly of plastics materials which are resistant to corrosion and attack by excreta, thus making the floor even more suitable for use in animal enclosures.

A further object of the invention is to allow the construction of a floor from a plurality of joists and a plurality of flooring members in a rapid and simple manner, which floor when assembled can bear relatively large weights—such as farm animals—and yet which can be disassembled without damaging the component joists and members.

Yet another object of the invention is to provide a floor which is both safe and comfortable for animals to stand, walk or lie on but which allows animal excreta to pass rapidly therethrough so as to obviate foul conditions for the animals.

A yet further object is to provide a floor which is suitable for use in industrial situations, where there may be spillages of liquids on the floor, which floor allows drainage of the liquids to collection pits or the like.

SUMMARY OF THE INVENTION

In accordance with the foregoing and other objects, the invention in its broadest aspect provides a flooring system comprising a plurality of parallel load-bearing spaced joists supporting a plurality of load-bearing flooring members which extend substantially at right angles to the joists, each flooring member having a web and a pair of flanges projecting downwardly from the web and being angled toward one another thereby to define a substantially channel-shaped cross-section, each joist having a plurality of pairs of spaced slots extending downwardly from the upper surface thereof and each pair of slots being disposed to receive said flanges of a flooring member carried by the joist but said slots having a length which is less than the depth of said flanges as measured from said web of the channel-shaped section to the free edges of said flanges, and said flanges being provided with spaced slots appropriately positioned for receiving parts of the joists in the region of an intersection between a joist and a flooring member, whereby a plurality of joists may be inter-engaged with a plurality of flooring members, and with said web of each flooring member resting on said upper surfaces of the associated joists.

It will be appreciated that if the flooring system of this invention is ventilated by providing the web portions of at least some of the channel-shaped flooring members with as many perforations of such dimensions as are required for the particular application to which the flooring system is to be put, the resultant assembled floor may be used for supporting livestock while allowing for the passage of both liquid and solid excreta therethrough. Moreover, the pairs of spaced slots in the joists may be appropriately positioned to provide gaps between adjacent parallel flooring members, thereby increasing the free air percentage of the overall floor. In this way, a floor can be provided which is both safe and comfortable for animals, while still allowing for the passage of excreta into a receiving pit beneath the floor. In addition, at least the flooring members themselves but possibly also the joists may be manufactured from a plastics material, thereby giving the flooring system considerable resistance to attack and corrosion by excreta.

BRIEF DESCRIPTION OF THE DRAWINGS

In order that this invention may better be understood, it will now be described in greater detail and preferred aspects thereof set out, as well as one specific embodiment of the invention being described by referring to the accompanying drawings. In the drawings.

DESCRIPTION OF THE PREFERRED EMBODIMENTS

Figure 2:
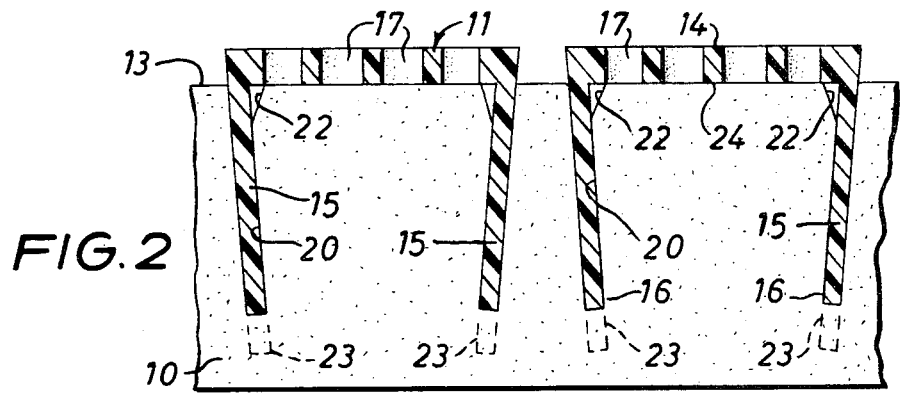
FIG. 2 is a part-sectional view of the flooring system, taken on line II—II marked on FIG. 1.

When a ventilated floor is made up from a plurality of joists and flooring members of this invention as described above, it is preferred for each joist to be of generally triangular cross-section with an apex uppermost, for in this way the relatively narrow upper part of each joist restricts the free air percentage of the floor (i.e. the area of the floor through which air may pass, expressed as a percentage of the total floor area) to a minimal extent. The section should however be truncated, to give a flat surface on which the flooring member may bear. Conveniently, each joist is generally in the form of a hollow section of essentially isosceles triangular shape, with a height to base ratio (after truncation) in the range of from 2:1 to 3:1. Though such a joist could be made from a metal for instance by fabrication, it is preferred for the joist to be manufactured from a plastics material, conveniently by an extrusion process. Suitable plastics materials which may exhibit sufficient strength for a joist and yet also display the required corrosion resistant properties include polypropylene and rigid polyethylene.

As has been mentioned above, the slots in each joist should be arranged in pairs, with the slots of each pair being positioned appropriately for receiving the flanges of a flooring member. The width of each slot should be such that a flange is a sliding fit therewithin, so as to ensure that a flooring member is held thereby against significant movement in directions other than parallel to the length of the member. It will thus be appreciated that the spacing between the slots of a pair at the top of a joist is greater than the spacing of the free edges of the flanges of a flooring member, because the two flanges of a flooring member lie at an angle to one another and the slots are correspondingly arranged. A consequence is that the two flanges of a flooring member must be sprung apart to allow the flanges to enter the two slots of a pair as the floor is assembled, and entry of the flanges into the slots may be assisted by cutting away the joist at the mouths of the slots to provide a bevel. It will be appreciated that once a flooring member has been fully interengaged with a joist, movement of the flooring member in a direction out of the plane of the member is resisted, since such movement requires the flanges again to spring apart.

By providing slots in the flanges of the flooring member for engagement with the joists supporting the member, movement of the flooring member along its length is prevented. In the case of a hollow triangular cross-sectional joist, such as may be produced by extruding a plastics material joist, at each joist location each flange should have two slots appropriately disposed for receiving the two upwardly extending walls respectively of the hollow triangular cross-section joist. In this way the interengagement of the joists and the flooring members at each intersection thereof in the flooring system firmly holds the flooring members and joists against relative movement in the plane of the floor, and moreover separation of the flooring members from the joists also is resisted, by virtue of the angled disposition of the flanges and slots.

It will be appreciated that because the flanges of the flooring members are located in slots in the joists and the webs of the flooring members are supported by the upper surfaces of the joists, the joists themselves serve to maintain the shape and load-bearing capacity of the flooring members, provided that the joists are sufficiently closely-spaced.

The slots in the flanges and in the joists can conveniently be provided after manufacture of the respective sections, for instance by cutting transversely to the length of the flooring members and joists respectively with a slitting saw, set up to provide the cuts at the required regular intervals.

In a specific embodiment of ventilated flooring system according to this invention as will be described in detail below, the joists are of hollow triangular cross-sectional shape, and with both the joists and the flooring members extruded from a plastics material and preferably a thermoplastics material such as polypropylene, rigid polyethylene or acrylonitrile butadiene-styrene, a free air percentage of approaching 50% can be obtained by providing apertures in the flooring members, while still satisfying other criteria for a floor suitable for supporting livestock.

In a typical installation of a floor of this invention, ledges are provided around the area to be floored, the joists bearing on said ledges. To increase the load-bearing capacity pillars can be provided within the area to be floored, which pillars give additional support for the joists intermediate the ends thereof. The flooring members are interengaged with the joists, to extend at right angles thereto, the load carried by the flooring members being transferred to the joists which in turn transfer the load to the ledges and the spaced pillars. For situations where even higher load-carrying capacities are required, further rigid joists—such as of reinforced concrete—may be laid across the pillars and the joists of the flooring system are carried by the further rigid joists, arranged at appropriate spacings.

Such a floor will now be described by referring to the accompanying drawings, which illustrate a part of and the assembly of a floor suitable for use in a pig pen. It can be seen that the flooring system of this invention comprises a plurality of spaced joists 10 extending parallel to one another and supporting spaced parallel flooring members 11. Each joist 10 is of hollow triangular cross-sectional shape, though the apex 12 of each joist is truncated to form a flat surface 13 on which the underside of a flooring member 11 may rest. Each joist is formed wholly of a plastics material such as rigid polyethylene or polypropylene, for instance by an extrusion moulding process.

Each flooring member 11 has a generally channel-shaped cross-section, comprising a web 14 from which a pair of flanges 15 depend downwardly, the flanges 15 lying at a small angle to one another of typically 5°, whereby the distance between the free edges 16 of the two flanges is smaller than the distance between the flanges in the region of the web 14. Provided in four rows along the length of the web 14 is a plurality of apertures 17, each aperture having two parallel side portions 18 and rounded end portions 19. The flooring members 11 are also formed wholly of a plastics material such as rigid polyethylene or polypropylene, for instance by an extrusion moulding process.

Both the joists 10 and the flooring members 11 are provided with slots, as will be described below, to allow the joists and flooring members 11 to be interengaged, as shown in the drawings. Each joist has a plurality of equi-spaced pairs of slots 20 in the two side walls 21 of the triangular cross-sectional shape, extending from the surface 13 downwardly for a length less than the depth of the flanges 15. Moreover, the two slots 20 of a pair thereof are disposed at an angle to one another, as shown in FIG. 2, this angle corresponding to the angle between the two flanges 15 of a flooring member 11, whereby the flanges 15 may be received in a pair of slots 20. Bevels 22 are provided in the surface 13, to facilitate the entry of the flanges 15 of a flooring member 11 into the slots 20.

In addition to the slots 20 in the joists, the flanges 15 are also slotted, at spaced intervals corresponding to the required spacing of the joists 10 of the assembled flooring system. The slots 23 in each flange are arranged in pairs, and are suitably disposed to receive the lower parts of the side walls 21 of a joist when the slots 20 in the joist receive the flanges 15 of a flooring member 11. Thus, the slots 23 in the flanges 15 should have such a length that the sum of the lengths of the slots 20 and slots 23 is equal to the overall depth of a flange 15, measured from the inside face 24 of the web 14 of a flooring member 11 to a free edge 16. Then, when a flooring member 11 is interengaged with a joist 10, the greater part of a flange 15 is received in a slot 20 but the slots 23 in the flange 15 receive the lower portions of the two side walls 21 of the joist 10, the inside face 24 of the flooring member then resting upon the upper surface 13 of the joist 10.

Figure 1:
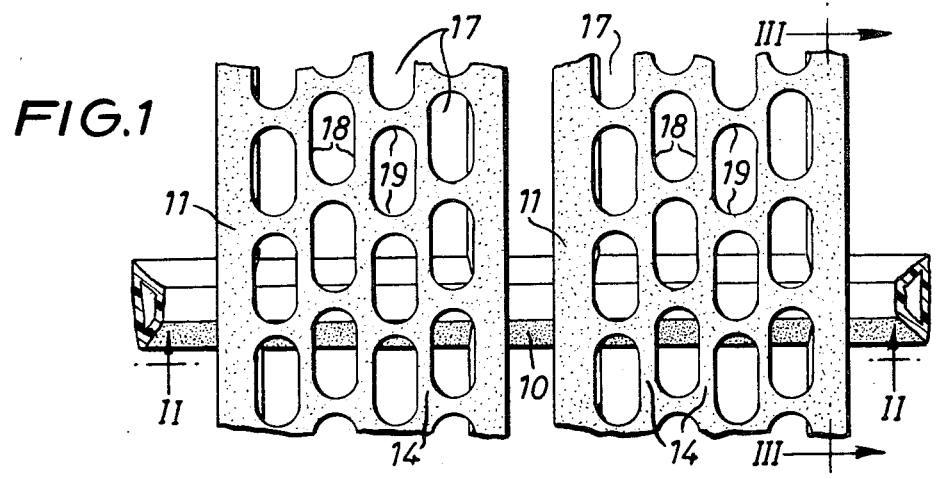
FIG. 1 is a plan view of a part of a flooring system of this invention.
Figure 3:
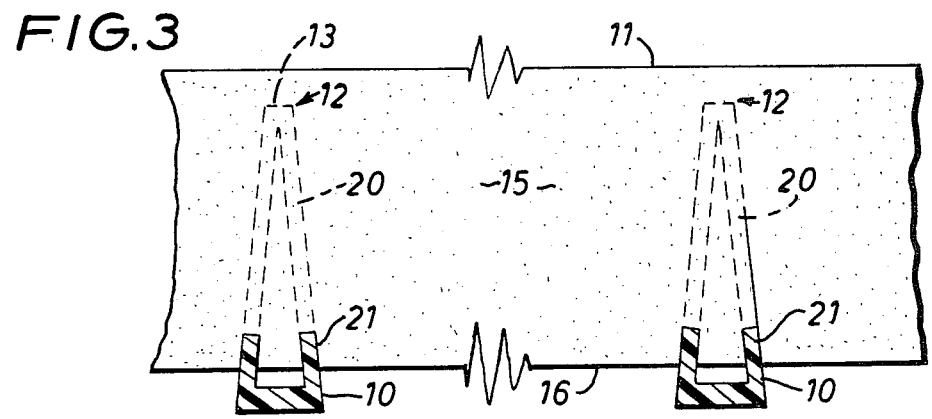
FIG. 3 is a further part-sectional view, taken on line III—III marked on FIG. 1.

In a typical embodiment of flooring system constructed in accordance with this invention, as described above and as shown in the drawings, the width of each flooring member 11, measured transverse to its length, is 75 mm and the overall depth of the flanges 15 also is 75 mm. The overall height of a joist is 75 mm and the slots 20 arranged therein are so disposed that there is a spacing of approximately 10 mm between adjacent flooring members 11. By providing the apertures 17 as shown in FIG. 1, with a width between the side portions 18 of approximately 10 mm and a length of approximately 22 mm, the flooring system may have a free air percentage of approximately 46%. The floor can be laid by arranging pillars to support the joists 10 at the required spacing, and once the joists have been laid thereon then the flooring members 11 can be interengaged with the joists, by springing the flanges 15 into the slots in the joists. Such a flooring system is particularly suitable for use as a floor of a livestock pen, or a pig farrowing crate. Because the flooring system is made wholly of a plastics material, it is resistant to attack by animal excreta and the relatively high free air percentage allows the passage of both liquid and solid excreta therethrough, to a collection pit therebelow. The solid excreta is forced through by the animals themselves using the floor, and to ensure that this occurs as quickly as possible it is most advantageous to have as high free air percentage as possible, thereby ensuring improved health conditions for the animals. In addition, because the upper surface of the floor is relatively flat and smooth, it is both comfortable and safe for animals, such as pigs, and the perforations give grip in all horizontal directions to the feet of the animals.

It will of course be appreciated that the described flooring system may be used in locations other than animal enclosures—for example in the process industries where liquid chemicals corrosive to metals may be spilt on the floor. The perforations in the flooring members and the spacing thereof should be adapted for the particular application of the floor.

What I claim is:

1. A flooring system comprising a plurality of parallel load-bearing spaced joists supporting a plurality of load-bearing flooring members which extend substantially at right angles to the joists, each said flooring member having a web and a pair of flanges projecting downwardly from the web and being angled toward one another thereby to define a substantially channel-shaped cross-section, each said joist being generally in the form of a hollow section of substantially truncated isosceles triangular shape with a height-to-base ratio in the range of from 2:1 to 3:1 and having a plurality of pairs of spaced slots extending downwardly from an upper surface thereof and each said pair of slots being disposed to receive said flanges of a flooring member carried by the joist but said slots having a length which is less than the depth of said flanges as measured from said web of the channel-shaped section to the free edges of said flanges, and said flanges being provided with spaced slots appropriately positioned for receiving parts of the joists in the region of an intersection between a joist and a flooring member, whereby a plurality of joists may be interengaged with a plurality of flooring members, and with said web of each flooring member resting on said upper surfaces of the associated joists.

2. A flooring system as claimed in claim 1, in which said webs of at least some of said channel-shaped flooring members are provided with a plurality of perforations whereby the assembled floor is ventilated.

3. A flooring system as claimed in claim 1 or claim 2, in which said pairs of spaced slots in said joists are appropriately positioned to give gaps between adjacent flooring members when said flooring members are assembled with said joists.

4. A flooring system as claimed in claim 1, in which said flooring members and said joists are manufactured from a plastics material.

5. A flooring system as claimed in claim 1, in which each slot of a pair thereof in a joist has such a width that a flange of a flooring member is a sliding fit therewithin, whereby a flooring member engaged therewith is held against substantial movement in directions other than parallel to the length of the flooring member.

6. A flooring system as claimed in claim 1, in which apexes of said triangular cross-sectional joists are uppermost and said webs of said flooring members bear on said apexes.

7. A flooring system as claimed in claim 6, in which the upper portion of each said triangular cross-sectional joist is truncated to provide a flat surface on which said flooring member webs may bear.

8. A flooring system comprising a plurality of parallel load-bearing spaced joists made of a plastics material and supporting a plurality of load-bearing flooring members also made of a plastics material and which extend substantially at right angles to the joists, each said flooring member having a web provided with perforations along the length thereof and a pair of flanges projecting downwardly from said perforated web and being angled toward one another thereby to define a substantially channel-shaped cross-section, each said joists being generally in the form of a hollow section of substantially truncated isosceles triangular shape, with a height-to-base ratio in the range of from 2:1 to 3:1 and having a plurality of pairs of spaced slots extending downwardly from an upper surface thereof and each said pair of slots being disposed to receive said flanges of a flooring member carried by the joist but said slots having a length which is less than the depths of said flanges as measured from said web of the channel-shaped section to the free edges of said flanges, the spacing of the pairs of said slots being greater than the width of said flooring members whereby there are gaps between adjacent assembled flooring members, and said flanges of said flooring members being provided with spaced slots appropriately positioned for receiving parts of said joists in the region of an intersection between a joist and a flooring member, whereby a plurality of flooring members may be interengaged with a plurality of joists with said web of each flooring member resting on said upper surfaces of the associated joists.

9. A flooring system comprising a plurality of parallel load-bearing spaced plastics material joists supporting a plurality of load-bearing plastics material flooring members which extend substantially at right angles to the joists, each said flooring member having a flat web and a pair of flanges projecting downwardly from the web and being angled towards one another thereby to define a substantially channel-shaped cross-section, each said joist having a plurality of pairs of spaced slots having a width substantially the same as a width of said flanges and extending downwardly from an upper surface thereof and each said pair of slots being disposed to receive said flanges of a flooring member carried by the joist but said slots having a length which is less than the depth of said flanges as measured from said web of the channel-shaped section to the free edges of said flanges, and said flanges being provided with spaced slots appropriately positioned for receiving parts of the joists in the region of an intersection between a joist and a flooring member, whereby a plurality of joists may be interengaged with a plurality of flooring members, and with said web of each flooring member resting on said upper surfaces of the associated joists, said joists being substantially triangular in cross-sectional shape and adapted for assembly with said flooring members such that the apexes of said triangular cross-sectional joists are uppermost and said webs of said flooring members bear on said apexes.

10. A flooring system as claimed in claim 9, in which the upper portion of each said triangular cross-sectional joist is truncated thereby to provide a flat surface on which said flooring member webs may bear.

11. A flooring system as claimed in claim 10, in which each said joist is generally in the form of a hollow section of essentially isosceles triangular shape, with a height-to-base ratio (after truncation) in the range of from 2:1 to 3:1.

* * * * *